United States Patent
Park

(10) Patent No.: US 10,970,001 B2
(45) Date of Patent: Apr. 6, 2021

(54) MEMORY CONTROLLER AND MEMORY SYSTEM HAVING THE SAME WHEREIN READ REQUEST THAT HAS A LOGICAL TO PHYSICAL MAPPING IN A CACHE, IS PRIORITIZED OVER PAIRING OPERATION FOR MULTI-PLANE READING

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 30 days.

(21) Appl. No.: 16/430,728

(22) Filed: Jun. 4, 2019

(65) Prior Publication Data

US 2020/0125293 A1  Apr. 23, 2020

(30) Foreign Application Priority Data

Oct. 22, 2018  (KR) .................. 10-2018-0126317

(51) Int. Cl.
*G06F 3/06* (2006.01)
(52) U.S. Cl.
CPC ............ *G06F 3/0659* (2013.01); *G06F 3/061* (2013.01); *G06F 3/0673* (2013.01); *G06F 2212/7201* (2013.01)

(58) Field of Classification Search
CPC .................................................. G06F 3/0659
See application file for complete search history.

(56) References Cited

U.S. PATENT DOCUMENTS

2008/0301397 A1* 12/2008 Goh .................... G06F 12/0875
711/202
2019/0065055 A1* 2/2019 Lin ....................... G06F 3/0679

FOREIGN PATENT DOCUMENTS

KR   10-2014-0113176   9/2014
KR   10-1687762        1/2017

\* cited by examiner

*Primary Examiner* — Reginald G Bragdon
*Assistant Examiner* — Chie Yew
(74) *Attorney, Agent, or Firm* — IP & T Group LLP

(57) ABSTRACT

A memory controller controls an operation of a memory device including a plurality of planes, based on a request from a host. The memory controller includes a request storage unit and a request controller. The request storage unit stores a plurality of read requests received from the host. The request controller controls the request storage unit to perform a processing operation for a read request that has been map-cache-hit, more preferentially than a pairing operation for multi-plane reading, based on whether the plurality of read requests have been map-cache-hit.

16 Claims, 13 Drawing Sheets

| NO. | RQ_id | PLN_No. | Hit/Miss |
|---|---|---|---|
| 0 | A | 3 | 0 |
| 1 | B | 2 | 1 |
| 2 | C | 2 | 0 |
| 3 | D | 1 | 1 |
| 4 | E | 3 | 0 |
| 5 | F | 4 | 0 |
| 6 | G | 3 | 1 |
| 7 | H | 1 | 0 |

MEMORY CONTROLLER AND MEMORY SYSTEM HAVING THE SAME WHEREIN READ REQUEST THAT HAS A LOGICAL TO PHYSICAL MAPPING IN A CACHE, IS PRIORITIZED OVER PAIRING OPERATION FOR MULTI-PLANE READING

CROSS-REFERENCE TO RELATED APPLICATION

The present application claims priority under 35 U.S.C. § 119(a) to Korean patent application number 10-2018-0126317, filed on Oct. 22, 2018, which is incorporated herein by reference in its entirety.

BACKGROUND

Field of Invention

The present disclosure generally relates to a memory controller and a memory system having the same, and more particularly, to a memory controller capable of performing a multi-plane operation and a memory system having the same.

Description of Related Art

A memory device may store data or output data. For example, the memory device may be configured as a volatile memory device in which stored data is extinguished when the supply of power is interrupted, or be configured as a nonvolatile memory device in which stored data is retained even when the supply of power is interrupted. The memory device may include a memory cell array for storing data, a peripheral circuit for performing various operations such as program, read, and erase operations, and a control logic for controlling the peripheral circuit.

A memory controller may control data communication between a host and the memory device.

The memory device may communicate with the memory controller through a channel. For example, a data output buffer in the peripheral circuit included in the memory device may output data read from the memory device through the channel.

SUMMARY

Embodiments provide a memory controller capable of increasing the speed of a read operation and a memory system having the memory controller.

In accordance with an aspect of the present disclosure, there is provided a memory controller for controlling, based on a request from a host, an operation of a memory device including a plurality of planes, the memory controller including: a request storage unit configured to store a plurality of read requests received from the host; and a request controller configured to control the request storage unit to perform a processing operation for a read request that has been map-cache-hit, more preferentially than a pairing operation for multi-plane reading, based on whether the plurality of read requests have been map-cache-hit.

The request controller may control the request storage unit to process the top priority read request when a top priority read request stored in the request storage unit is a read request that has been paired.

The request controller may control the request storage unit to perform a processing operation for a read request, based on whether the plurality of read requests have been map-cache-hit when the top priority read request stored in the request storage unit is a read request that has not been paired.

The request controller may designate the map-cache-hit read request as a top priority read request when a read request that has been map-cache-hit among the plurality of read requests exists.

The request controller may perform a pairing operation of read requests that have not been map-cache-hit while the map-cache-hit read request is being processed.

The request controller may perform a pairing operation on a current top priority read request when the read request that has been map-cache-hit among the plurality of read requests does not exist.

The memory controller may further include a map cache buffer configured to cache at least a portion of the map data stored in the memory device.

The memory controller may further include a command generator configured to generate a read command, based on a top priority read request received from the request storage unit.

In accordance with another aspect of the present disclosure, there is provided a memory system for performing a read operation of data, based on a read request from a host, the memory system including: a memory device including a plurality of planes; and a memory controller configured to control the memory device to perform a multi-plane read operation by paring read requests of different planes among a plurality of read requests received from the host, wherein the memory controller controls the memory device to perform a read operation based on a read request that has been map-cache-hit, more preferentially than a pairing operation for multi-plane reading, based on whether the plurality of read requests have been map-cache-hit.

The memory controller may control the memory device to preferentially perform the read operation based on the map-cache-hit read request when a read request that has been map-cache-hit among the plurality of read requests exists.

The memory controller may perform a pairing operation of read requests that have not been processed while the read operation based on the map-cache-hit read request is being performed.

The memory controller may perform a pairing operation of a top priority read request among the plurality of received read requests when the read request that has been map-cache-hit among the plurality of read requests does not exist.

In accordance with still another aspect of the present disclosure, there is provided a method for operating a memory controller for controlling a read operation of a memory device including a plurality of planes, the method including: receiving a plurality of read requests from a host; determining whether a read request that has been map-cache-hit among the plurality of read requests exists; and processing the plurality of read requests, based on the determination result.

The processing of the plurality of read requests when the read request that has been map-cache-hit exists as the determination result may include: designating the map-cache-hit read request as a top priority read request; and controlling the memory device to perform a read operation corresponding to the top priority read request.

The processing of the plurality of read requests may further include pairing read requests for different planes among read requests that have not been processed while the memory device is performing the read operation corresponding to the top priority read request.

The processing of the plurality of read requests when the read request that has been map-cache-hit does not exist as the determination result may include: performing a pairing operation on a top priority read request among the plurality of read requests; and controlling the memory device to perform a read operation corresponding to the paired top priority read request.

In accordance with still another aspect of the present disclosure, there is provided a memory controller for controlling a memory device. The memory controller including: a request queue configured to sequentially enqueue read requests; a request control unit configured to pair two or more among the queued read requests for a multi-plane read operation to all planes of the memory device, and to determine a top priority read request among the queued read requests; and a command generator configured to generate, based on the top priority read request, a read command for a read operation or the multi-plane read operation. The request control unit determines, as the top priority read request, a read request which is map cache hit among the queued read requests when the paired read requests do not have a top priority.

BRIEF DESCRIPTION OF THE DRAWINGS

Example embodiments will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

In the present disclosure, advantages, features and methods for achieving them will become more apparent after a reading of the following exemplary embodiments taken in conjunction with the drawings. The present disclosure may, however, be embodied in different forms and should not be construed as being limited to the embodiments set forth herein. Rather, these embodiments are provided to describe the present disclosure in detail to the extent that those skilled in the art to which the disclosure pertains may easily enforce the technical concept of the present disclosure.

In the entire specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 1:
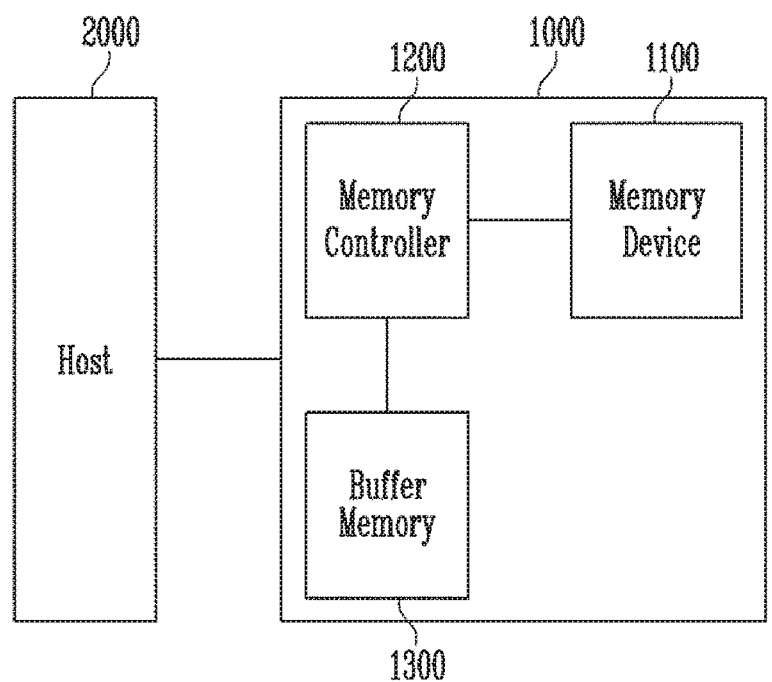
FIG. 1 is a diagram illustrating a memory system.

FIG. 1 is a diagram illustrating a memory system 1000.

Referring to FIG. 1, the memory system 1000 may include a memory device 1100 for storing data, a buffer memory 1300 for temporarily storing data necessary for an operation of the memory system 1000, and a memory controller 1200 for controlling the memory device 1100 and the buffer memory 1300 under the control of a host 2000.

The host 2000 may communicate with the memory system 1000, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The memory device 1100 may be implemented as a volatile memory device in which data is not retained when the supply of power is interrupted, or a nonvolatile memory device in which data is retained even when the supply of power is interrupted. The memory device 1100 may perform a program operation, a read operation or an erase operation under the control of the memory controller 1200. For example, in a program operation, the memory device 1100 may receive a command, an address, and data from the memory controller 1200, and perform the program operation. In a read operation, the memory device 1100 may receive a command and an address from the memory controller 1200, and output read data to the memory controller 1200. To this end, the memory device 1100 may include an input/output circuit for inputting/outputting data.

The memory controller 1200 may control overall operations of the memory system 1000, and control data exchange between the host 2000 and the memory device 1100. For example, the memory controller 1200 may program, read or erase data by controlling the memory device 1100 in response to a request from the host 2000. Also, the memory controller 1200 may receive data and a logical address from the host 2000, and translate the logical address into a physical address indicating an area in which data in the memory device 1100 is to be actually stored. Furthermore, the memory controller 1200 may store, in the buffer memory 1300, a logical-to-physical address mapping table that establishes a mapping relationship between the logical address and the physical address.

The memory controller 1200 may generate commands in response to one or more requests received from the host 2000. More specifically, the memory device 1100 may include a plurality of planes, and the memory controller 1200 may control a multi-plane operation of the memory device 1100 including the plurality of planes, based on a request from the host 2000. The memory controller 1200 may generate a read command by pairing read requests respectively for reading different planes among a plurality of read requests received from the host 2000, and transfer the generated read command to the memory device 1100. Since the transferred read command is generated based on the paired read requests, the memory device 1100 may perform a multi-plane read operation on a plurality of planes, based on the read command.

"Pairing" of a plurality of read requests may mean, an operation of binding a plurality of read requests that is to be processed at one time for a multi-plane read operation. To this end, a plurality of read requests as a target of a pairing operation are to read different planes. A pairing operation of read requests will be described later with reference to FIGS. 12A to 12C.

In accordance with an embodiment of the present disclosure, the memory controller 1200 may control the memory device 1100 to perform a read operation based on a read request that has been map-cache-hit, more preferentially than the pairing operation for multi-plane reading, based on whether the plurality of read requests have been map-cache-hit.

The buffer memory 1300 may be used as a working memory or cache memory of the memory controller 1200, and store system data used in the memory system 1000 in addition to the above-described information. In some embodiments, the buffer memory 1300 may include a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random Access Memory (RDRAM), etc.

Figure 2:
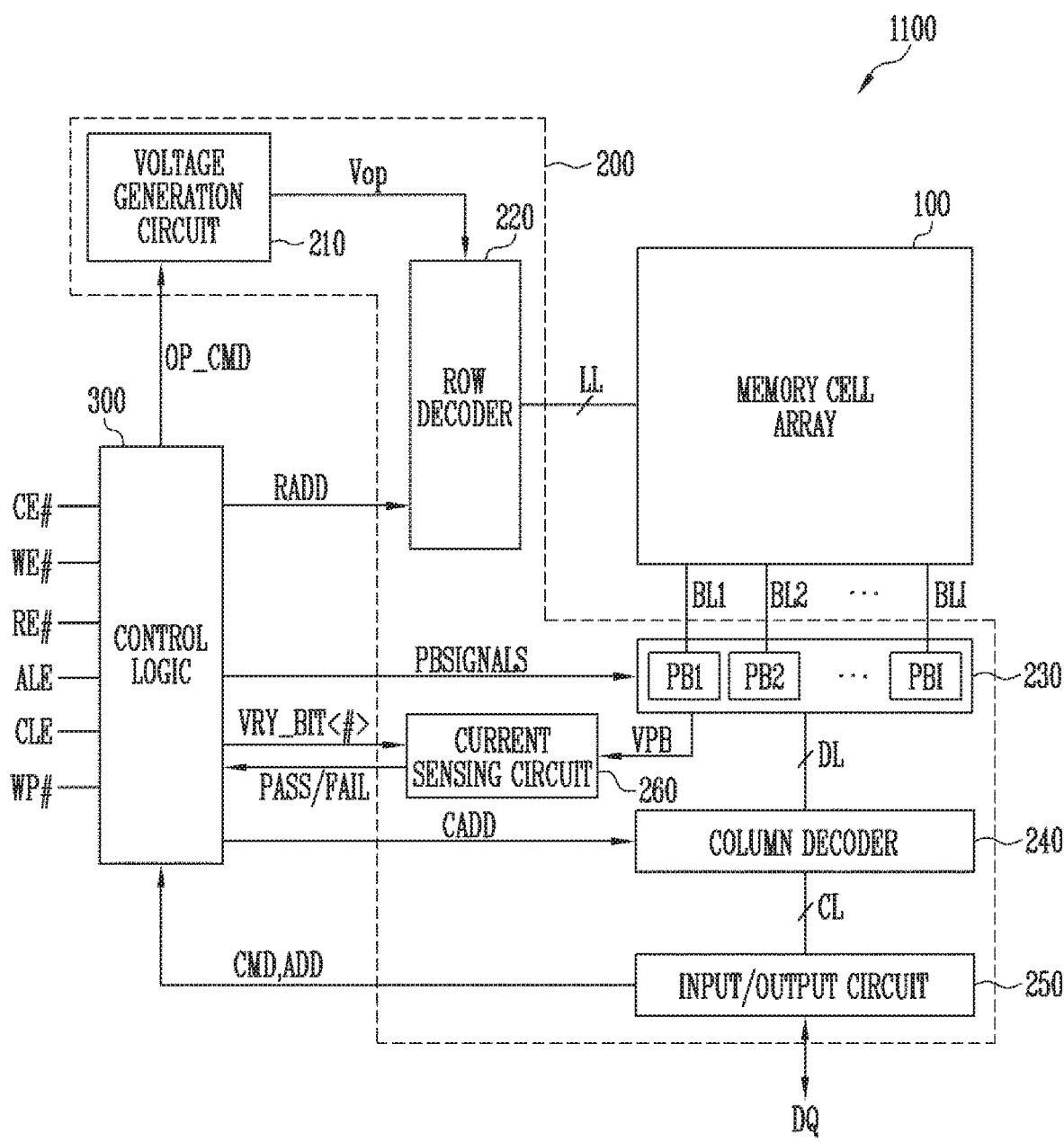
FIG. 2 is a diagram illustrating in detail a memory device of FIG. 1.

FIG. 2 is a diagram illustrating in detail the memory device of FIG. 1.

Referring to FIG. 2, the memory device 1100 may be implemented as a volatile memory device or a nonvolatile memory device. In FIG. 2, a nonvolatile memory device is illustrated as an embodiment, but this embodiment is not limited to the nonvolatile memory device.

The memory device 1100 may include a memory cell array 100 that stores data. The memory device 1100 may include a peripheral circuit 200 configured to perform a program operation for storing data in the memory cell array 100, a read operation for outputting the stored data, and an erase operation for erasing the stored data. The memory device 1100 may include a control logic 300 that controls the peripheral circuit 200 under the control of the memory controller 1200 of FIG. 1.

The memory cell array 100 includes a plurality of memory cells for storing data. For example, the memory cell array 100 may include one or more planes, and each of the planes may include one or more memory blocks. Each of the memory blocks may include a plurality of memory cells. A structure including a plurality of planes may be referred to as a multi-plane structure. User data and various information necessary for an operation of the memory device 1100 may be stored in the memory blocks. The memory blocks may be implemented in a two-dimensional or three-dimensional structure. Recently, memory blocks having a three-dimensional structure have been mainly used so as to improve the degree of integration. Memory blocks having the two-dimensional structure may include memory cells arranged in parallel to a substrate, and memory blocks having the three-dimensional structure may include memory cells stacked vertically to a substrate.

The peripheral circuit 200 may be configured to perform program, read, and erase operations under the control of the control logic 300. For example, the peripheral circuit 200 may include a voltage generation circuit 210, a row decoder 220, a page buffer group 230, a column decoder 240, an input/output circuit 250, and a current sensing circuit 260.

The voltage generation circuit 210 may generate various operating voltages Vop used for program, read, and erase operations in response to an operation signal OP_CMD output from the control logic 300. For example, the voltage generation circuit 210 may generate a program voltage, a verify voltage, a pass voltage, a read voltage, an erase voltage, and the like under the control of the control logic 300.

The row decoder 220 may transfer the operating voltages Vop to local lines LL connected to a selected memory block among the memory blocks of the memory cell array 100 in response to a row address RADD. The local lines LL may include local word lines, local drain select lines, and local source select lines. In addition, the local lines LL may include various lines such as a source line, which are connected to the memory block.

The page buffer group 230 may be connected to bit lines BL1 to BLI connected to the memory blocks of the memory cell array 100. The page buffer group 230 may include a plurality of page buffers PB1 to PBI connected to the bit lines BL1 to BLI. The page buffers PB1 to PBI may operate in response to page buffer control signals PBSIGNALS. For example, the page buffers PB1 to PBI may temporarily store data received through the bit lines BL1 to BLI, or sense voltages or currents of the bit lines BL1 to BLI in a read or verify operation.

The column decoder 240 may transfer data between the input/output circuit 250 and the page buffer group 230 in response to a column address CADD. For example, the column decoder 240 may exchange data with the page buffers PB1 to PBI through data lines DL, or exchange data with the input/output circuit 250 through column lines CL.

The input/output circuit 250 may receive a command CMD, an address ADD, and data from the memory controller 1200 of FIG. 1 through an input/output pad DQ, and output read data to the memory controller 1200 through the input/output pad DQ. For example, the input/output circuit 250 may transfer the command CMD and the address ADD, which are received from the memory controller 1200, to the control logic 300, or exchange the data with the column decoder 240.

In a read operation or a verify operation, the current sensing circuit 260 may generate a reference current in response to a allow bit VRY_BIT<#>, and output a pass signal PASS or a fail signal FAIL by comparing a sensing voltage VPB received from the page buffer group 230 with a reference voltage generated by the reference current.

The control logic 300 may receive the command CMD and the address ADD in response to signals received through CE #, WE #, RE #, ALE, CLE, ad WP # pads. The control logic 300 may control the peripheral circuit 200 by outputting the operation signal OP_CMD, the row address RADD, the page buffer control signals PBSIGNALS, and the allow bit VRY_BIT<#> in response to the command CMD and the address ADD. The control logic 300 may determine whether the verify operation has passed or failed in response to the pass or fail signal PASS or FAIL.

Figure 3:
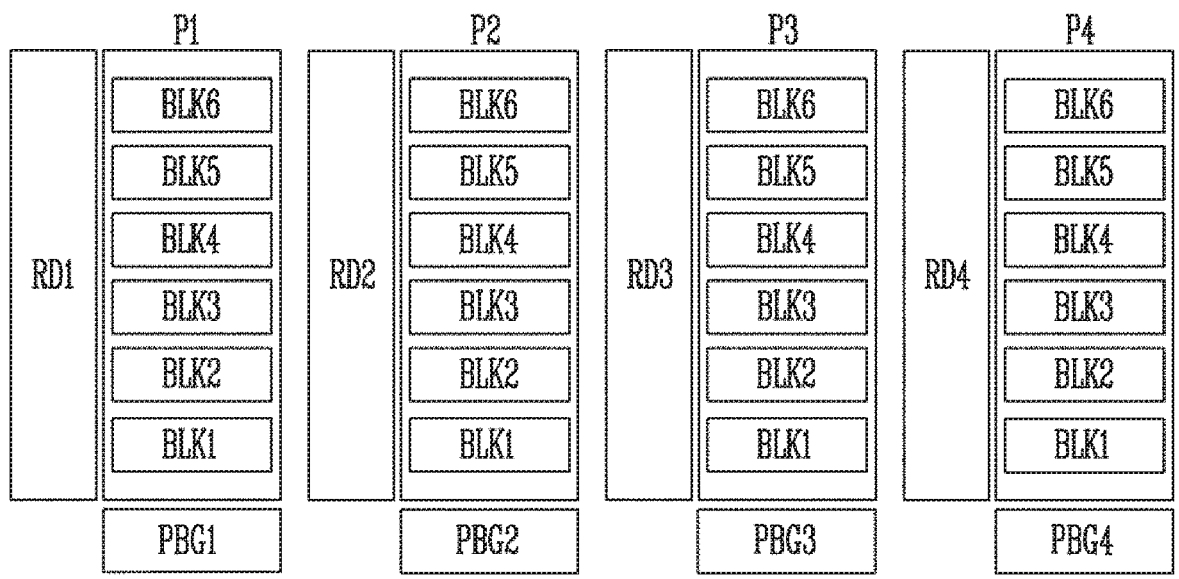
FIG. 3 is a diagram illustrating a multi-plane structure.

FIG. 3 is a diagram illustrating a multi-plane structure.

Referring to FIG. 3, the memory device 1100 having the multi-plane structure may include a plurality of planes P1 to P4.

For example, first to fourth planes P1 to P4 may be included in one memory device 1100. Although four planes are exemplarily illustrated in FIG. 3, the number of planes is not limited thereto.

The first to fourth planes P1 to P4 may be connected to row decoders RD1 to RD4 and page buffer groups PBG1 to PBG4, respectively, and each of the first to fourth planes P1 to P4 may independently operate. For example, the first plane P1 may operate by being connected to a first row decoder RD1 and a first page buffer group PBG1, and the second plane P2 may operate by being connected to a second row decoder RD2 and a second page buffer group PBG2. The third plane P3 may operate by being connected to a third row decoder RD3 and a third page buffer group PBG3, and the fourth plane P4 may operate by being connected to a fourth row decoder RD4 and a fourth page buffer group PBG4. The first to fourth row decoders RD1 to RD4 and the first to fourth page buffers PBG1 to PBG4 may all be controlled by the control logic 300 of FIG. 2, and the first to fourth planes P1 to P4 may operate at the same time.

For example, in a read operation, the first to fourth row decoders RD1 to RD4 may apply read voltages to memory blocks selected from the first to fourth planes P1 to P4 in response to received row addresses, respectively. The first to fourth page buffer groups PBG1 to PBG4 may temporarily store read data by sensing voltages or currents of bit lines connected to the first to fourth planes P1 to P4. When sensing operations of the first to fourth planes P1 to P4 are all completed, the read data temporarily stored in the first to fourth page buffer groups PBG1 to PBG4 may be sequentially output through the input/output circuit 250 of FIG. 2. For example, after the read data temporarily stored in the first page buffer group PBG1 is firstly output, the read data temporarily stored in the second to fourth page buffer groups PBG2 to PBG4 may be sequentially output. Such a multi-plane read operation will be described later with reference to FIG. 13.

Each of the plurality of planes may include a plurality of memory blocks BLK1 to BLK6. A multi-plane operation of simultaneously processing operations on the plurality of planes may be performed so as to process, in parallel, operations on memory blocks of the respective planes. In an embodiment, a plane may be a unit of a memory area accessed when a program, read or erase operation is performed. Therefore, in the multi-plane structure in which the memory device 1100 includes a plurality of planes, an erase, read or program operation may be performed simultaneously on blocks or pages located in different planes.

In accordance with an embodiment of the present disclosure, the memory controller 1200 may control a read operation on a plurality of planes included in the memory device 1100. For example, the memory controller 1200 may control the memory device 1100 to perform the read operation simultaneously on the plurality of planes by providing the memory device 1100 read commands for different planes such that a multi-plane read operation on the memory device 1100 is performed.

In an embodiment of the present disclosure, the memory controller 1200 may control the memory device 1100 to perform the multi-plane read operation, using an interleaving scheme. Specifically, the memory controller 1200 may pair read requests for different planes in the same memory device 1100, and generate a read command corresponding to the paired read requests and then transfer the generated read command to the memory device 1100. The memory device 1100 may perform a read operation on a plurality of planes, using the interleaving scheme, corresponding to the received read command.

Figure 4:
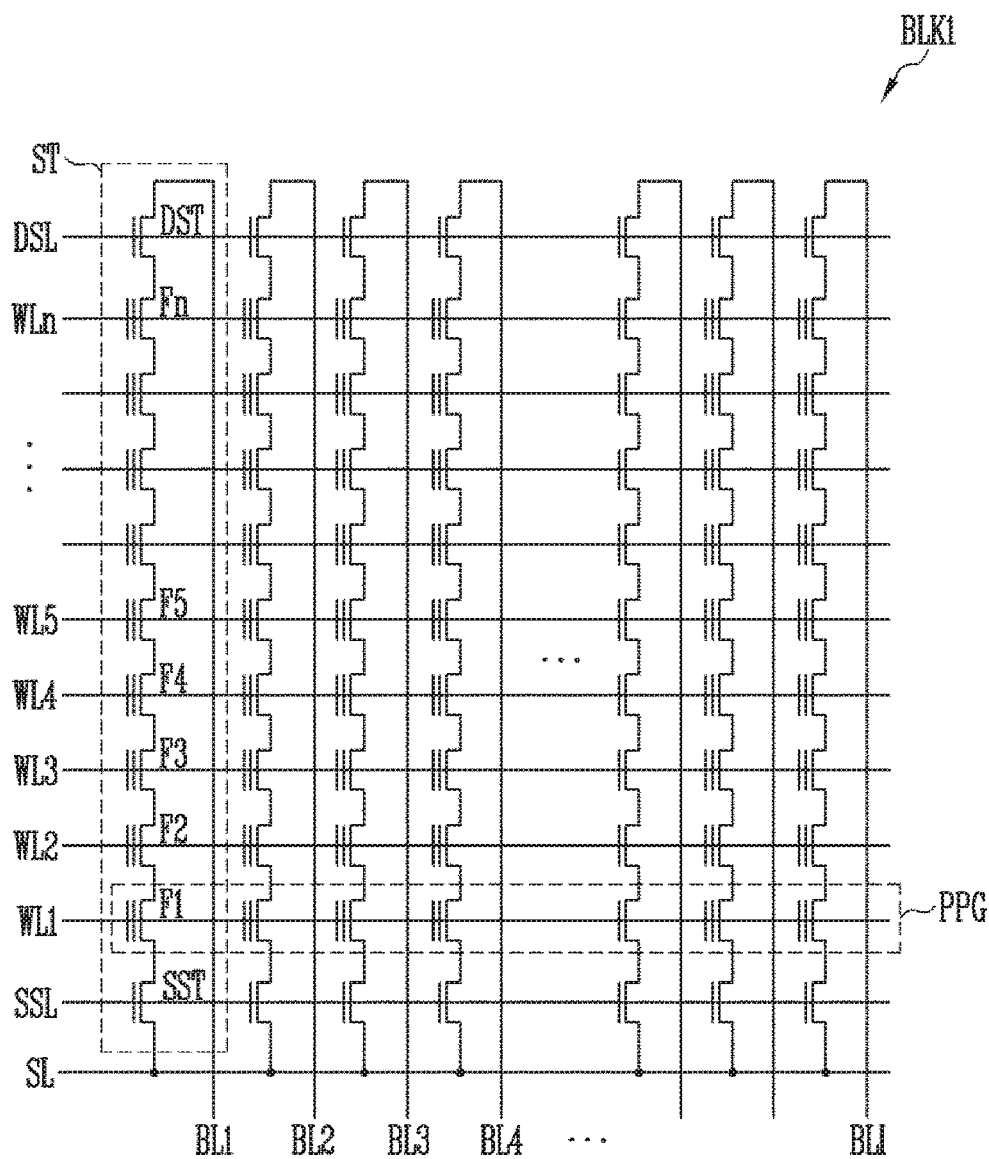
FIG. 4 is a diagram illustrating a memory block of FIG. 3.

FIG. 4 is a diagram illustrating the memory block of FIG. 3.

Referring to FIG. 4, the plurality of memory blocks BLK1 to BLK6 shown in FIG. 3 may be configured identically to one another, and therefore, a first memory block BLK1 among the memory blocks BLK1 to BLK6 will be described as an example.

The first memory block BLK1 may include a plurality of cell strings ST connected between bit lines BL1 to BLI and a source line SL. For example, the cell strings ST may be respectively connected to the bit lines BL1 to BLI, and be commonly connected to the source line SL. The cell strings ST are configured similarly to one another, and therefore, a cell string ST connected to a first bit line BL1 will be described as an example.

The cell string ST may include a source select transistor SST, first to nth memory cells F1 to Fn (n is a positive integer), and a drain select transistor DST, which are connected in series between the source line SL and the first bit line BL1. The number of source select transistors SST and drain select transistors DST is not limited to that shown in FIG. 4. The source select transistor SST may be connected between the source line SL and the first memory cell F1. The first to nth memory cells F1 to Fn may be connected in series between the source select transistor SST and the drain select transistor DST. The drain select transistor DST may be connected between the nth memory cell Fn and the first bit line BL1. Although not shown in the drawing, dummy cells may be further connected between the memory cells F1 to Fn or between the source select transistor SST and the drain select transistor DST.

Gates of the source select transistors SST included in different cell strings ST may be connected to a source select line SSL, gates of the first to nth memory cells F1 to Fn included in different cell strings ST may be connected to first to nth word lines WL1 to WLn, and gates of the drain select transistors DST included in different cell strings may be connected to a drain select line DSL. A group of memory cells connected to each of the word lines WL1 to WLn is referred to as a page PG. For example, a group of the first memory cells F1 connected to the first word line WL1 among the memory cells F1 to Fn included in different cell strings ST may become one physical page PPG. Program and read operations may be performed in unit of physical pages PPG.

Figure 5:
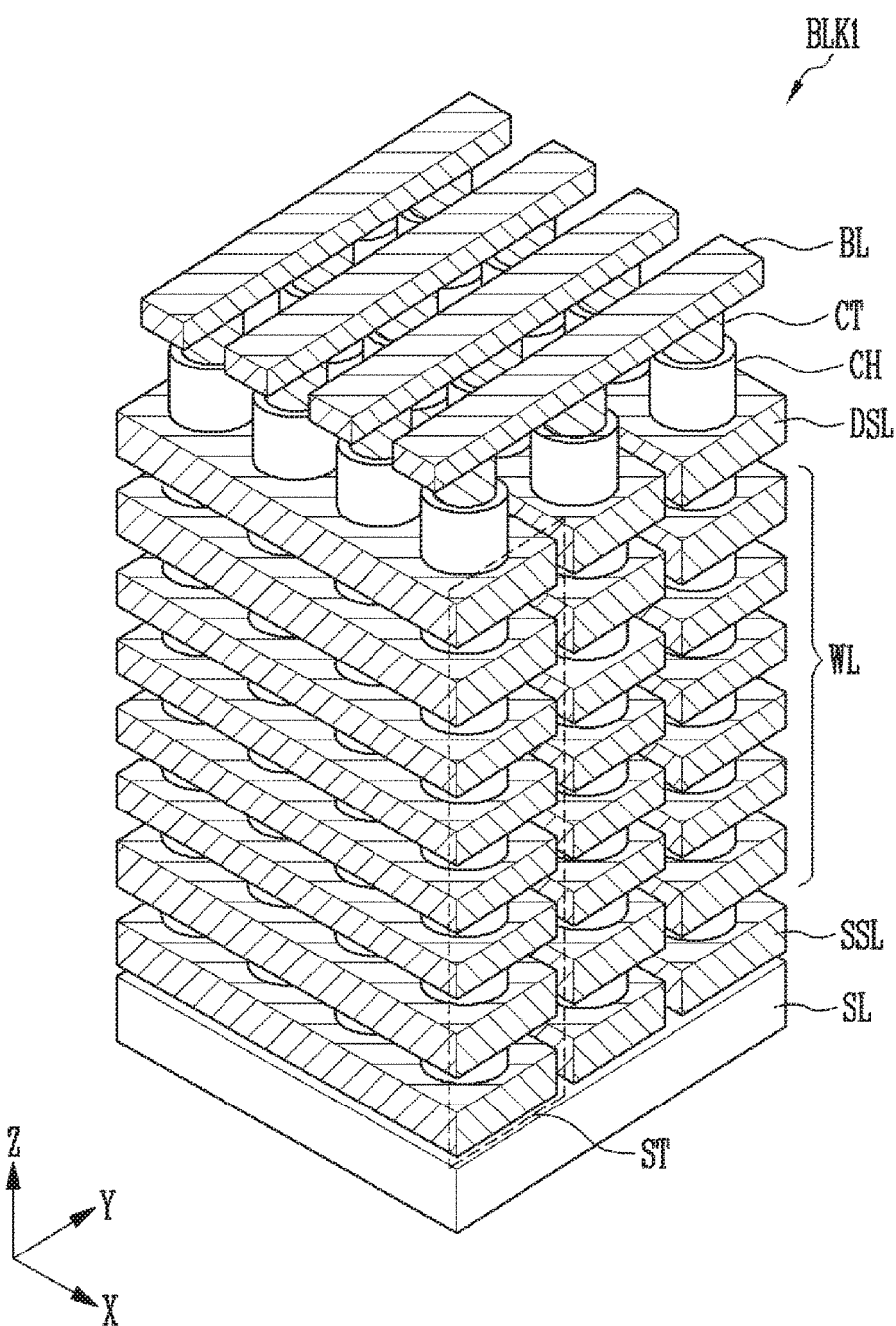
FIG. 5 is a diagram illustrating an embodiment in which the memory block of FIG. 3 is three-dimensionally configured.

FIG. 5 is a diagram illustrating an embodiment in which the memory block of FIG. 3 is three-dimensionally configured.

Referring to FIG. 5, the first memory block BLK1 implemented in the three-dimensional structure may be formed in an I shape on a substrate in a direction (Z direction) vertical to the substrate, and include a plurality of cell strings ST arranged between bit lines BL and a source line SL. Alternatively, a well may be formed instead of the source line SL. This structure is also referred to as a Bit Cost Scalable (BiCS) structure. For example, when the source line SL is formed in parallel to the substrate above the substrate, the cell strings ST having the BiCS structure may be formed in the direction (Z direction) vertical to the substrate on the top of the source line SL.

More specifically, the cell strings ST may be arranged in a first direction (X direction) and a second direction (Y direction). The cell strings ST may include source select lines SSL, word lines WL, and drain select lines DSL, which are stacked while being spaced apart from each other. The number of source select lines SSL, word lines WL, and drain select lines DSL is not limited to that shown in the drawing, and may be changed depending on the memory device 100. The cell strings ST may include vertical channel layers CH vertically penetrating the source select lines SSL, the word lines WL, and the drain select lines DSL, and the bit lines BL that are in contact with the tops of the vertical channel layers CH protruding to the tops of the drain select lines DSL and extend in the second direction (Y direction). Memory cells may be formed between the word lines WL and the vertical channel layers CH. Contact plugs CT may be further formed between the bit lines BL and the vertical channel layers CH.

Figure 6:
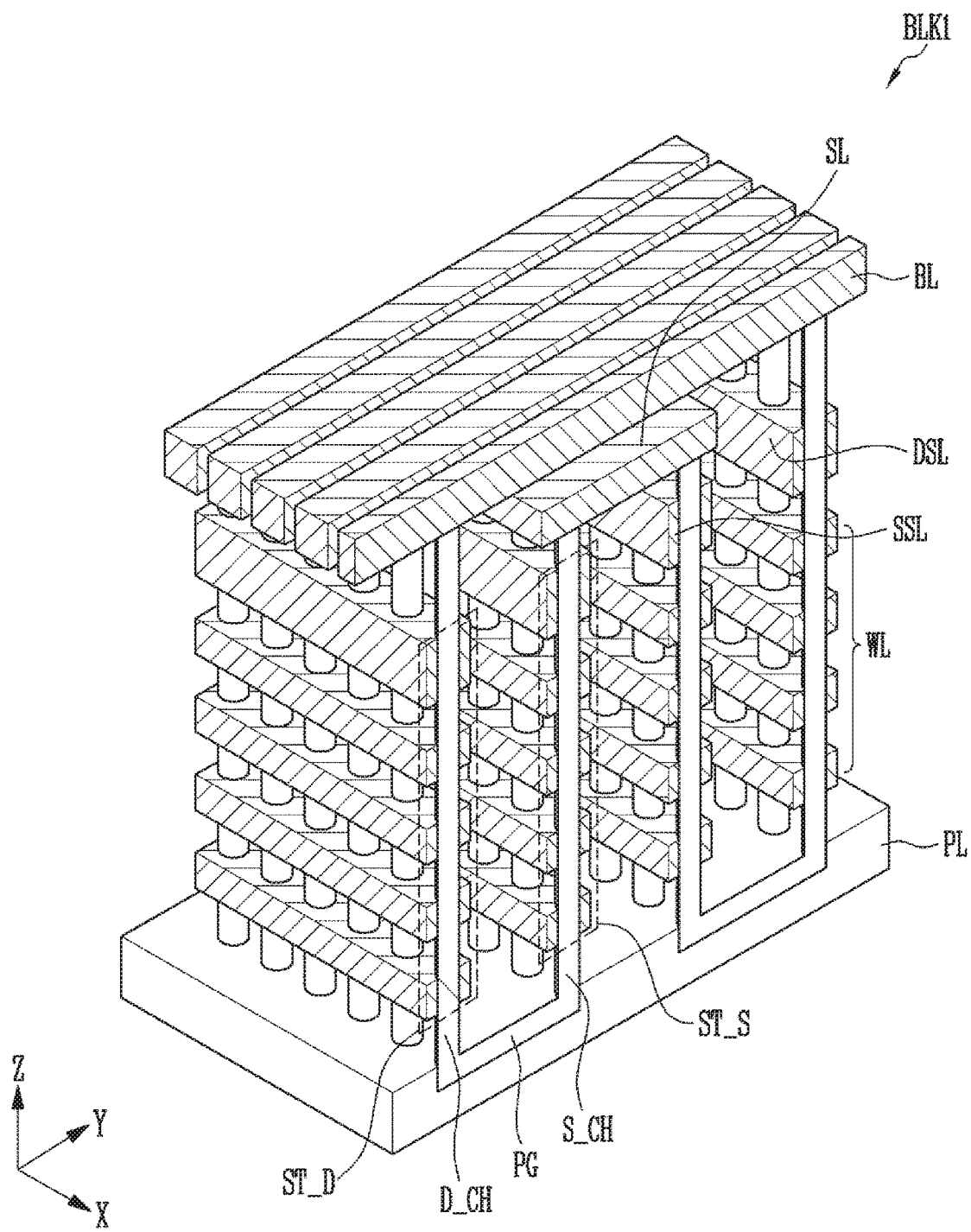
FIG. 6 is a diagram illustrating another embodiment in which the memory block of FIG. 3 is three-dimensionally configured.

FIG. 6 is a diagram illustrating another embodiment in which the memory block of FIG. 3 is three-dimensionally configured.

Referring to FIG. 6, the first memory block BLK1 having the three-dimensional structure may be formed on a substrate in a U shape in a direction (Z direction) vertical to the substrate, and include source strings ST_S and drain strings ST_D, which are connected between bit lines BL and source lines SL and form pairs. The source string ST_S and the drain string ST_D may be connected to each other through a pipe gate PG to form a U-shaped structure. The pipe gate PG may be formed in a pipe line PL. More specifically, the source strings ST_S may be formed vertically to the substrate between the source line SL and the pipe line PL, and the drain strings ST_D may be formed vertically to the substrate between the bit lines BL and the pipe line PL. This structure is also referred to as a Pipe-shaped Bit Cost Scalable (P-BiCS) structure.

More specifically, the drain strings ST_D and the source strings ST_S may be arranged in a first direction (X direction) and a second direction (Y direction). The drain strings ST_D and the source strings ST_S may be alternately arranged along the second direction (Y direction). The drain strings ST_D may include word lines WL and a drain select line DSL, which are stacked while being spaced apart from each other, and drain vertical channel layers D_CH that vertically penetrate the word lines WL and the drain select line DSL. The source strings ST_S may include word lines WL and a source select line SSL, which are stacked while being spaced apart from each other, and source vertical channel layers S_CH that vertically penetrate the word lines WL and the source select line SSL. The drain vertical channel layers D_CH and the source vertical channel layers S_CH may be connected to each other by the pipe gate PG in the pipe line PL. The bit lines BL may be in contact with the tops of the drain vertical channel layers D_CH protruding to the top of the drain select line DSL, and extend in the second direction (Y direction).

The first memory block BLK1 may be implemented in various structures in addition to the structures described in FIGS. 4 to 6.

Figure 7:
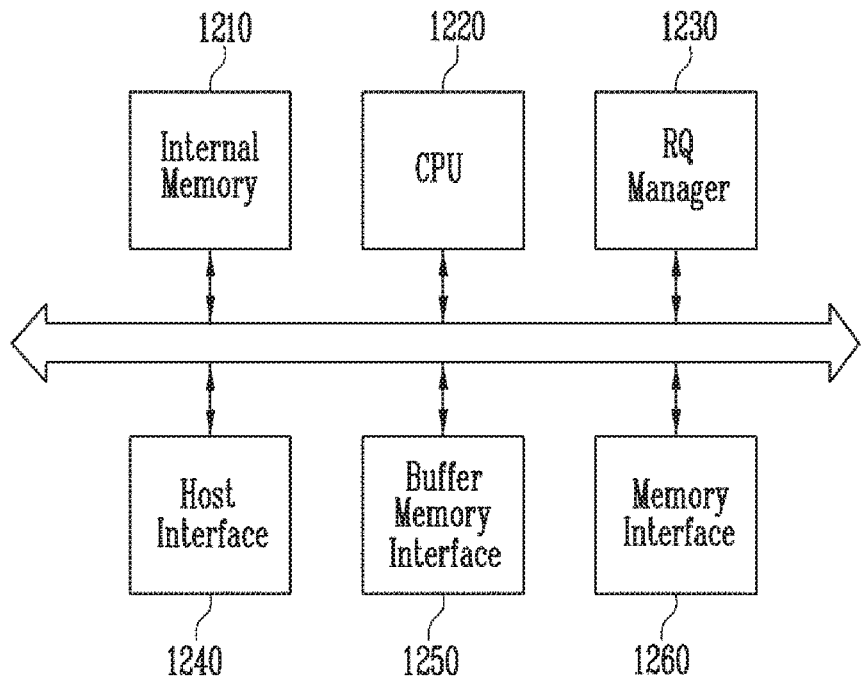
FIG. 7 is a diagram illustrating in detail a memory controller of FIG. 1.

FIG. 7 is a diagram illustrating in detail the memory controller 120 of FIG. 1.

Referring to FIG. 7, the memory controller 120 may include an internal memory 1210, a central processing unit (CPU) 1220, a request (RQ) manager 1230, a host interface 1240, a buffer memory interface 1250, and a memory interface 1260.

The internal memory 1210 may store various information necessary for an operation of the memory controller 1200. For example, the internal memory 1210 may include logical and physical address map tables. The internal memory 1210 may be configured with at least one of a Random Access Memory (RAM), a Dynamic RAM (DRAM), a Static RAM (SRAM), and a Tightly Coupled Memory (TCM).

The CPU 1220 may perform various calculations for controlling the memory device 1100. Also, the CPU 1220 may control operations of the internal memory 1210, the RQ manager 1230, the host interface 1240, the buffer memory interface 1250, and the memory interface 1260, which are different components in the memory controller 1200.

The RQ manager 1230 may store requests received from the host 2000, and generate a command, based on the received request. The generated command may be transferred to the memory device 1100 through the memory interface 1260.

The host interface 1240 may exchange a command, an address, data, and the like between the memory controller 1200 and the host 2000. For example, the host interface 1240 may receive a request, an address, data, and the like from the host 2000, and output data read from the memory device 1100 to the host 2000. The host interface 1240 may communicate with the host 2000 by using a protocol such as a Peripheral Component Interconnect express (PCIe), an Advanced Technology Attachment (ATA), a Serial ATA (SATA), a Parallel ATA (PATA), a Serial Attached SCSI (SAS) or a Non-Volatile Memory express (NVMe). The host interface 1240 is not limited to the above-described example, and may include various interfaces such as a Universal Serial Bus (USB), a Multi-Media Card (MMC), an Enhanced Small Disk Interface (ESDI), and Integrated Drive Electronics IDE.

The buffer memory interface 1250 may transmit data between the CPU 1220 and the buffer memory 1300. When the buffer memory 1300 is included in the memory controller 1200, the buffer memory interface 1250 may be omitted.

The memory interface 1260 may exchange a command, an address, data, and the like between the memory controller 1200 and the memory device 1100. For example, the memory interface 1260 may transmit a command, an address, data, and the like to the memory device 1100 through a channel, and receive data and the like from the memory device 1100.

Figure 8:
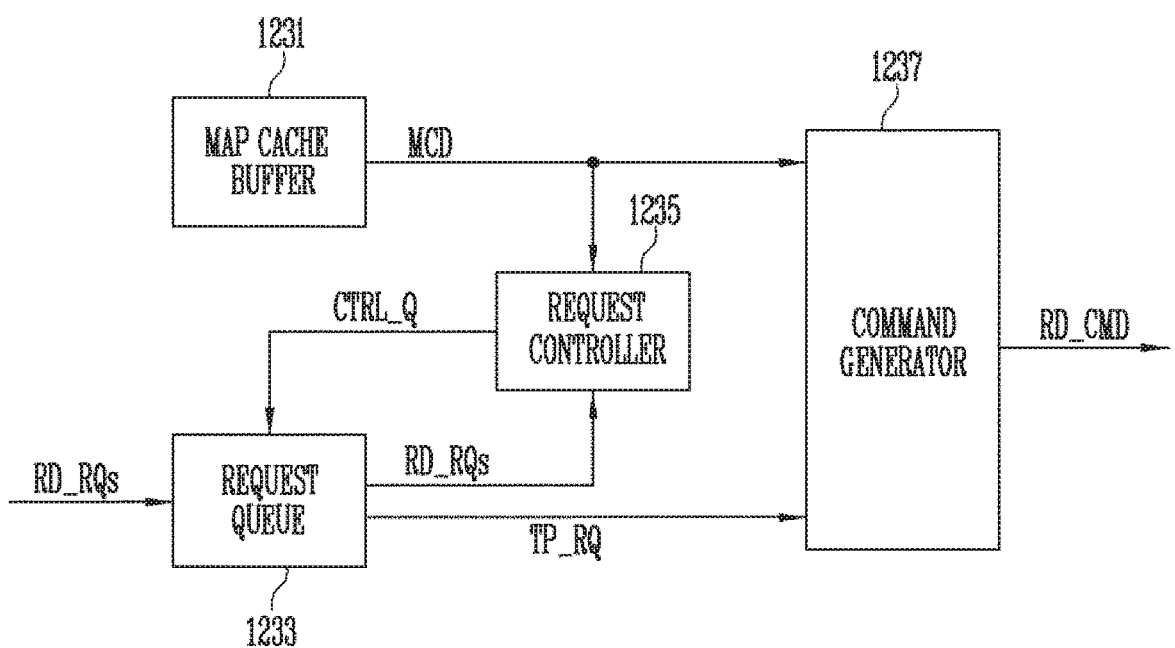
FIG. 8 is a block diagram illustrating in detail a request manager of FIG. 7.

FIG. 8 is a block diagram illustrating in detail the RQ manager 1230 of FIG. 7.

Referring to FIG. 8, the RQ manager 1230 may include a map cache buffer 1231, a request queue 1233, a request controller 1235, and a command generator 1237.

The map cache buffer 1231 may cache a portion of map data mapping logical and physical addresses of data stored in the memory device 1100. In general, when the capacity of the memory device 1100 increases, the size of map data also increases. The entire map data may be stored in a partial area in the memory cell array 100 of the memory device 1100. In order to improve the operation speed of the memory system, a portion of the entire map data may be cached to the map cache buffer 1231. More specifically, the map cache buffer 1231 may cache a portion of the entire map data in units of segments. When map data corresponding to a read request received from the host 2000 is cached in the map cache buffer 1231, this means that the corresponding read request has been map-cache-hit. When a read request is map-cache-hit, a read command may be generated using map data stored in the map cache buffer without reading map data of the corresponding read request from the memory device 1100.

In the embodiment of FIG. 8, a case where the map cache buffer 1231 is included in the RQ manager 1230 is illustrated. In another embodiment, the map cache buffer 1231 may be included in the internal memory 1210 of the memory controller 1200. The map cache buffer 1231 may be included in the buffer memory 1300.

The request queue 1233 may store requests received from the host 2000. In an example, the request queue 1233 may queue requests RD_RQs and corresponding logical addresses received from the host 2000. The request queue 1233 may transfer a top priority read request TP_RQ having the highest order of priority among the queued requests to the command generator 1237, based on a control signal CTRL_Q from the request controller 1235. In the embodiment of FIG. 8, the request queue 1233 is illustrated as a component for storing the received request, but various other storage units may be used to store requests.

The request controller 1235 may control the request queue 1233 to perform a processing operation of a read request that has been map-cache-hit, more preferentially than a pairing operation for multi-plane reading, based on whether the plurality of read requests RD_RQs stored in the request queue 1233 have been map-cache-hit. More specifically, the request controller 1235 may receive the plurality of read requests RD_RQs from the request queue 1233. In another embodiment, the request controller 1235 may receive descriptors indicating the plurality of read requests RD_RQs, instead of receiving the read requests RD_RQs from the request queue 1233.

Meanwhile, the request controller 1235 receives map cache data MCD cached in the map cache buffer 1231. The request controller 1235 determines whether a read request that has been map-cache-hit exists among the plurality of read requests RD_RQs provided from the request queue 1233 by comparing the map cache data MCD and the read requests RD_RQs.

When a read request that has been map-cache-hit exists, the request controller 1235 may control the request queue 1233 such that the map-cache-hit read request becomes a top priority read request TP_RQ. The request controller 1235 may designate the map-cache-hit read request as a top priority read request TP_RQ through the control signal CTRL_Q.

After the map-cache-hit read request is designated as the top priority read request TP_RQ, the request queue 1233 may transfer the top priority read request TP_RQ to the command generator 1237.

The command generator 1237 may generate a read command RD_CMD, based on the top priority read request TP_RQ. The command generator 1237 may generate the read command RD_CMD, based on the map cache data MCD received from the map cache buffer 1231. The generated read command RD_CMD is transferred to the memory device 1100, and the memory device 1100 performs a read operation, based on the received read command RD_CMD.

Meanwhile, before it is determined whether the read requests RD_RQs have been map-cache-hit, the request controller 1235 may determine whether the top priority read request TP_RQ queued in the request queue 1233 has already been paired. When it is determined that the top priority read request TP_RQ has already been paired, the request controller 1235 may control the request queue 1233 to transfer the top priority read request TP_RQ that has already been paired to the command generator 1237. Hereinafter, an operation of the memory controller including the RQ manager shown in FIG. 8 will be described with reference to FIG. 9 together.

Figure 9:
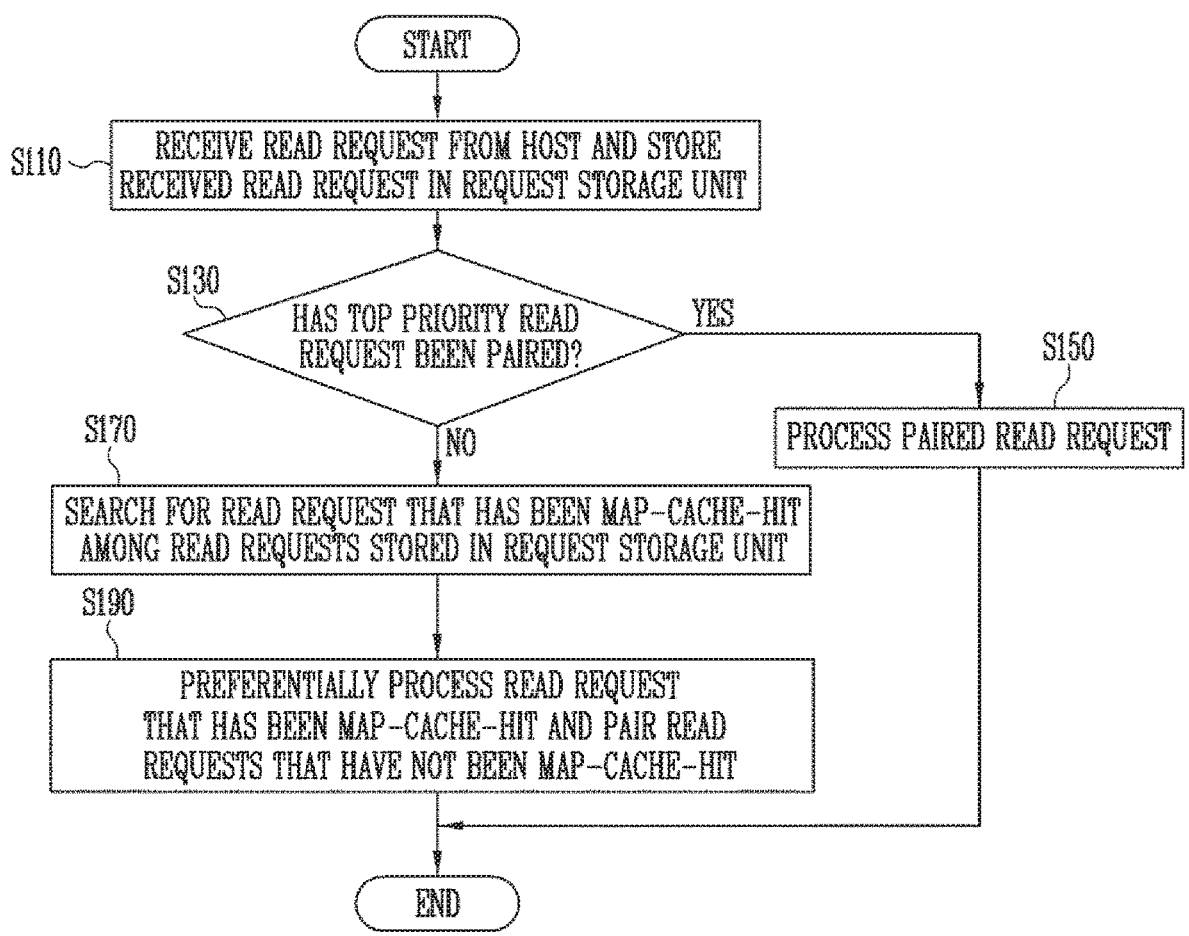
FIG. 9 is a flowchart illustrating an operating method of the memory controller in accordance with an embodiment of the present disclosure.

FIG. 9 is a flowchart illustrating an operating method of the memory controller 1200 in accordance with an embodiment of the present disclosure.

Referring to FIGS. 8 and 9 together, the memory controller 1200 receives a read request from the host 2000 and stores the received read request in a request storage unit (S110). The request storage unit may include the request queue 1233 shown in FIG. 8. Subsequently, the RQ manager 1230 determines whether a top priority read request TP_RQ stored in the request storage unit has already been paired (S130).

When the top priority read request TP_RQ has already been paired, the paired read request is processed (S150). In the step S150, the request controller 1235 may control the request queue 1233 to immediately process the corresponding read request. The paired top priority read request TP_RQ may be transferred to the command generator 1237. The command generator 1237 may generate a read command RD_CMD, based on the received top priority read request TP_RQ, and transfer the generated read command RD_CMD to the memory device 1100.

When the top priority read request TP_RQ has not been paired as the determination result of the step S130, the request controller 1235 searches a read request that has been map-cache-hit among read requests RD_RQs stored in the request storage unit (S170). In the step S170, map cache data MCD received from the map cache buffer 1231 may be used to search for the read request that has been map-cache-hit.

Subsequently, the request controller 1235 may preferentially process the read request RD_RQ that has been map-cache-hit, and pair read requests RD_RQs that have not been map-cache-hit (S190).

According to a typical multi-plane operation method, read requests RD_RQs received from the host 2000 are sequentially processed according to an order in which the read requests are received. In some cases, the pairing of a top priority read request TP_RQ may be delayed. For example, in a multi-plane operation of the memory device including first to fourth planes, at least one read command for each of the first to fourth planes is to be input so as to perform a pairing operation. In some cases, when a read request RD_RQ for any one plane among the first to fourth planes is not input, the pairing operation cannot be performed, and therefore, the entire read operation may be delayed. This may be a bottleneck to an operation of the memory system 1000, and become a factor that lowers the entire operation speed. In addition, the pairing operation may be performed with at least one read command for each of the first to fourth planes. However, the pairing operation takes time in itself, and therefore, a read delay may occur.

In accordance with the embodiment of the present disclosure, a read request RD_RQ that has been map-cache-hit is preferentially processed, so that read delay due to the pairing operation can be prevented. Further, a pairing operation on subsequent read requests is performed while the read request that has been map-cache hit is being processed, so that read delay due to the pairing operation can be reduced.

A more detailed embodiment of the step S190 will be described later with reference to FIG. 10.

Figures 10, 11:
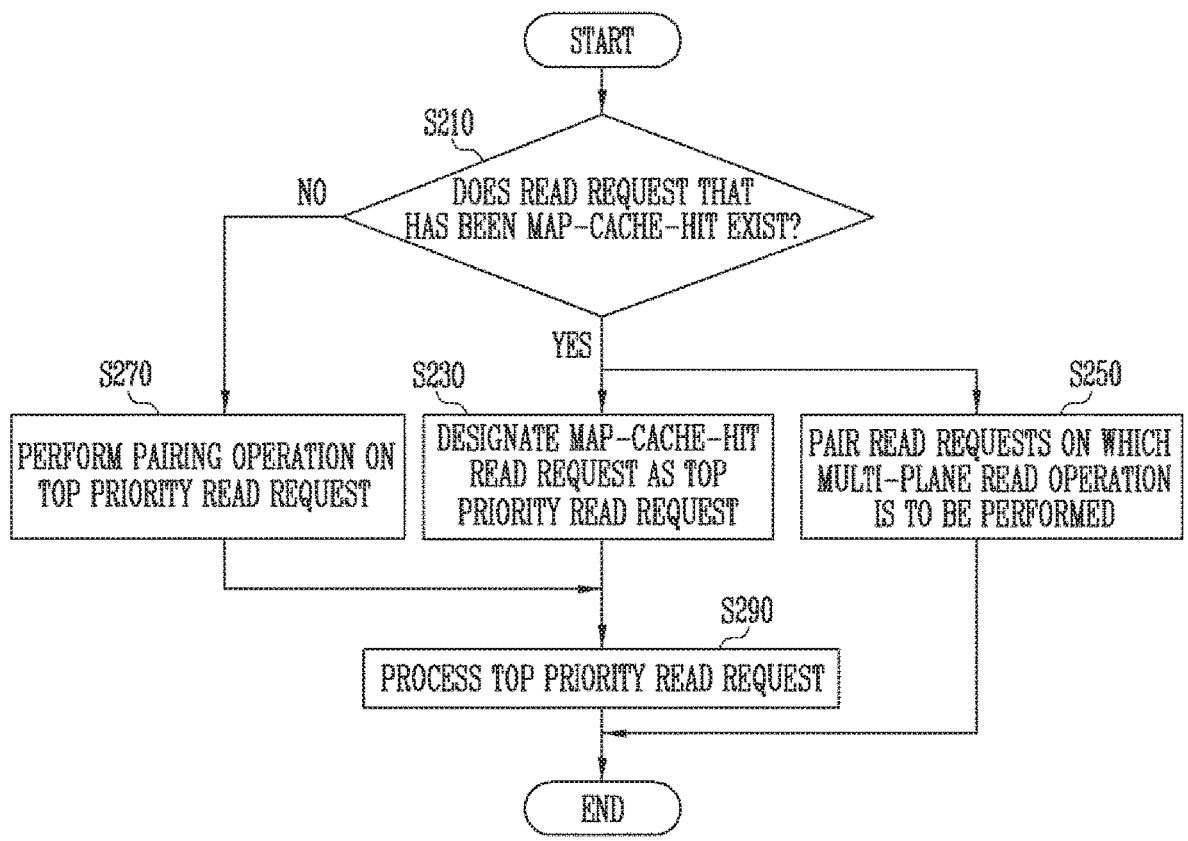
FIG. 10 is a flowchart illustrating in more detail a step of FIG. 9.
FIG. 11 is a diagram exemplarily illustrating read requests input to the memory controller from a host.

FIG. 10 is a flowchart illustrating in more detail the step S190 of FIG. 9.

In order to preferentially process a read request that has been map-cache-hit, the request controller 1235 determines whether a read request that has been map-cache-hit exists among the plurality of read requests RD_RQs queued in the request queue 1233 and thus provided from the request queue 1233 by comparing the map cache data MCD and the read requests RD_RQs (S210). When a read request that has been map-cache-hit exists, the request controller 1235 may designate the map-cache-hit read request as a top priority read request TP_RQ (S230). Subsequently, the top priority read request TP_RQ is processed (S290). More specifically, the read request designated as the top priority read request TP_RQ is transferred to the command generator 1237, and the command generator 1237 generates a corresponding read command RD_CMD and then transfers the generated read command RD_CMD to the memory device 1100.

Meanwhile, when a read request that has been map-cache-hit exists as the determination result of the step S210, read requests remaining in the request queue 1233 may be paired while the map-cache-hit read request is being processed (S250). In the step S250, the request controller 1235 may perform a pairing operation on read requests that have not been map-cache-hit and thus remain in the request queue 1233 among the subsequent read requests.

Meanwhile, when the read request that has been map-cache-hit does not exist as the determination result of the step S210, the request controller 1235 may perform a pairing operation on a current top priority read request TP_RQ (S270). Subsequently, the top priority read request TP_RQ that has been paired are processed (S290).

FIG. 11 is a diagram exemplarily illustrating read requests input to the memory controller 1200 from a host 2000.

Referring to FIG. 11, read requests input to the memory controller 1200 are illustrated as a table. In the table of FIG. 11, a leftmost field (NO.) represents an input order (i.e., the priority) of read requests, and a second field (RQ_id) represents a request ID for distinguishing read requests. Meanwhile, a third field (PLN_No.) represents a plane number where a read operation corresponding to each request is performed (i.e., the target plane ID of the corresponding read request), and a last field (Hit/Miss) represent whether a corresponding read request has been map-cache-hit. The value of the last field (Hit/Miss) is 1 when the corresponding read request is map-cache-hit and 0 when the corresponding read request is not map-cache-hit.

In FIG. 11, eight read requests that are sequentially input to the memory controller 1200 are illustrated. A first read request A is used to read a third plane of the memory device 1100, and is a read request that has not been map-cache-hit. A second read request B is used to read a second plane of the memory device 1100, and is a read request that has been map-cache-hit. In this manner, planes to be read with respect to read requests A to H and whether the read requests A to H have been map-cache-hit can be determined.

Referring to FIG. 11, it can be seen that only read requests for first to third planes have been input until a fifth read request E is input. Therefore, pairing of read requests cannot be performed until a fifth read request E is input. Subsequently, a pairing operation may be performed when a sixth read request F for reading a fourth plane is input.

According to the existing multi-plane operation method, the pairing operation cannot be performed while the first to fifth read requests A to E are being input, and hence the read requests A to E that have been stored cannot be processed. Accordingly, a read operation is unnecessarily delayed, which becomes a factor that lowers the entire operation speed of a memory system.

In accordance with the embodiment of the present disclosure, a read request that has been map-cache-hit is preferentially processed even when pairing cannot be performed, so that a phenomenon can be prevented in which pairing is delayed since read requests for some planes are not input, and therefore, the entire read speed is lowered. Further, a pairing operation on subsequent read requests is performed while the read request that has been map-cache hit is being processed, so that a phenomenon can be reduced in which a read delay occurs due to the pairing.

FIGS. 12A to 12E are diagrams illustrating a process of preferentially processing a read request that has been map-cache-hit in accordance with an embodiment of the present disclosure.

Figure 12A:
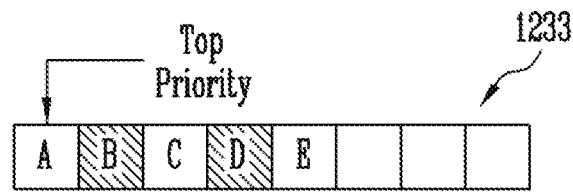
FIGS. 12A to 12E are diagrams illustrating a process of preferentially processing a read request that has been map-cache-hit in accordance with an embodiment of the present disclosure.

Referring to FIG. 12A, a case where the read requests RD_RQs are stored in the request queue 1233 in the order shown in FIG. 11 is illustrated. That is, a state in which five read requests A to E among the read requests RD_RQs shown in FIG. 11 are stored in the request queue 1233 is illustrated in FIG. 12A. In FIG. 12A, the read requests B and D are indicated by hatching in order to represent those requests B and D as the read requests that have been map-cache-hit.

The top priority read request A is in a state in which it has not been paired. In addition, the first to fifth read requests A to E stored in the request queue 1233 are read requests for the first to third planes, and hence a read request for the fourth plane has not yet stored in the request queue 1233. Therefore, a pairing operation for a multi-plane read operation cannot be performed in the situation shown in FIG. 12A (refer to step S130). Accordingly, the memory controller 1200 searches for a read request that has been map-cache-hit (S170), and preferentially process the map-cache-hit read request (S190).

Figure 12B:
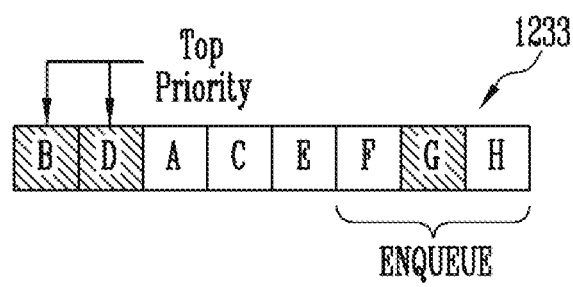

Since the read requests B and D that have been map-cache-hit exist as the determination result of the step S210, the map-cache-hit read requests B and D among the read requests A to E stored in the request queue 1233 are designated as top priority read requests as shown in FIG. 12B (S230). Meanwhile, subsequently, sixth to eighth read requests F, G, and H may be enqueued in the request queue 1233 as shown in FIG. 12B.

Figure 12C:
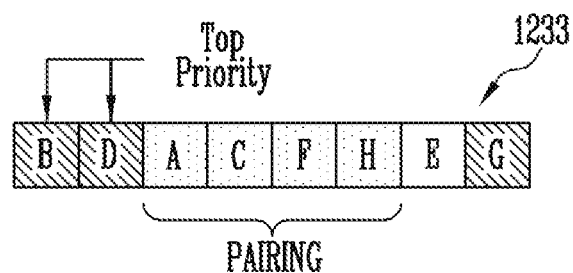

Referring to FIG. 12C, the read requests B and D designated as the top priority read requests are processed. The memory device 1100 may sequentially perform a single-plane read operation in response to the respective read requests B and D designated as the top priority read requests. Meanwhile, while the read requests B and D designated as the top priority read requests are being processed, the memory controller pairs read requests A, C, F, H on which a multi-plane read operation is to be performed among subsequent read requests A, C, E, F, G, and H (S250). While the memory device 1100 is performing the single-plane read operation in response to the read requests B and D, the memory controller 1200 may pair read requests A, C, F, and H to perform the multi-plane read operation. This is because the read requests A, C, F, and H are different planes, i.e., read requests for reading the first to fourth planes.

Figure 12D:
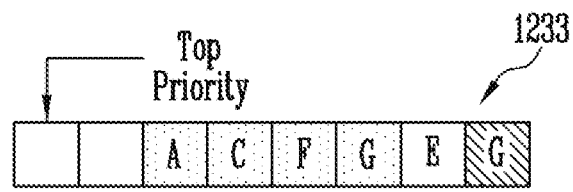
Figure 12E:
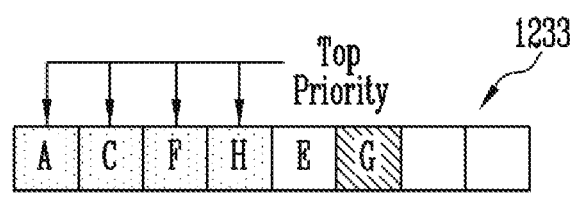

Referring to FIG. 12D, the read requests B and D that have been completely processed are removed from the request queue 1233. Subsequently, referring to FIG. 12E, the paired read requests A, C, F, and H are designated as top priority read requests, and the other read requests E and G that have not been paired are designated to have a subsequent priority.

As shown in FIGS. 12A to 12E, according to the memory controller and the operating method thereof in accordance with the embodiment of the present disclosure, a read request that has been map-cache-hit is preferentially processed, so that a phenomenon can be prevented in which, read requests for some planes are not input so pairing is delayed, and therefore, the entire read speed is lowered. Furthermore, a pairing operation on subsequent read requests is performed while the read request that has been map-cache hit is being processed, so that a phenomenon can be reduced in which a read delay occurs due to the pairing.

Figure 13:
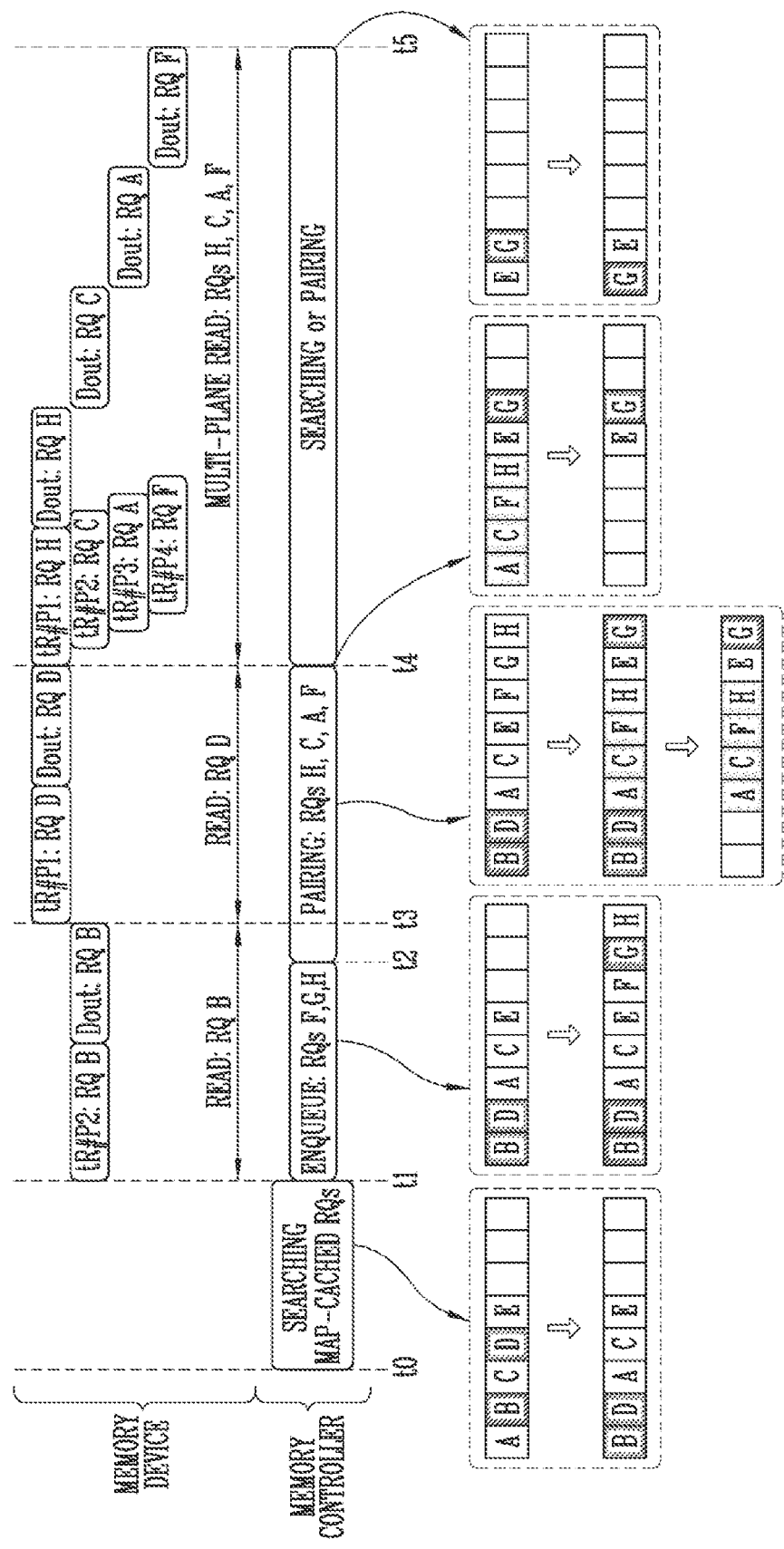
FIG. 13 is a diagram illustrating an operation of the memory system in accordance with an embodiment of the present disclosure.

FIG. 13 is a diagram illustrating an operation of the memory system 1000 in accordance with an embodiment of the present disclosure. In FIG. 13, an operation of the memory system 1000 according to the examples described with FIGS. 11 and 12A to 12E is illustrated.

In period t0 to t1, the memory controller 1200 searches for read requests that have been map-cache-hit among the read requests stored in the request queue 1233. In the period t0 to t1, the memory controller 1200 designates the read requests B and D that have been map-cache-hit to become top priority read requests.

In period t1 to t3, a read operation on the top priority read request B is performed (READ: RQ B). The read operation on the read request B is divided into two sub-operations. First, the memory device 1100 performs a data sensing operation on a selected page of the second plane corresponding to the read request B (tR#P2: RQ B). Subsequently, sensed data is output from the memory device 1100 to the memory controller 1200 (Dout: RQ B). When the read operation on the read request B is completed, the read request B is removed from the request queue 1233, and the next read request D becomes a top priority read request.

Meanwhile, in period t1 to t2, the sixth to eighth read requests F, G, and H may be enqueued in the request queue 1233. Since a read request for the fourth plane does not exist before the sixth to eighth read requests F, G, and H are enqueued in the request queue 1233, a pairing operation cannot be performed. After the sixth to eighth read requests F, G, and H are enqueued in the request queue 1233, read requests H, C, A, and F respectively corresponding to the first to fourth planes exist in the request queue 1233, and hence a pairing operation for a multi-plane read operation can be performed. Thus, the pairing operation is performed in period t2 to t4.

In period t3-t4, a read operation on the top priority read request D is performed (READ: RQ D). Similarly, the read operation on the read request D is divided into two sub-operations. First, the memory device 1100 performs data sensing operation on a selected page of the first plane corresponding to the read request D (tR #P1: RQ D). Subsequently, sensed data is output from the memory device 1100 to the memory controller 1200 (Dout: RQ D). When the read operation on the read request D is completed, the read request D is removed from the request queue 1233.

While the map-cache-hit read requests B and D are being processed, the memory controller 1200 may perform a pairing operation on subsequent read requests A, C, F, and H (PAIRING: RQs H, C, A, and F). Since the read requests A, C, F, and H are used to respectively perform read operations of the third plane, the second plane, the fourth plane, and the first plane, the read requests A, C, F, and H are paired during the period t2 to t4. When the map-cache-hit read requests B and D are completely processed and then removed from the request queue 1233, the paired read requests A, C, F, and H may be designated as top priority read requests at time t4.

Subsequently, in period t4 to t5, a multi-plane read operation on the paired read requests A, C, F, and H is performed (MULTI-PLANE READ: RQs H, C, A, and F). During the multi-plane read operation, the memory device 1100 performs a data sensing operation on the read request H (tR #P1: RQ H), performs a data sensing operation on the read request C (tR #P1: RQ C), performs a data sensing operation on the read request A (tR #P1: RQ A), and performs a data sensing operation on the read request F (tR #P1: RQ F). Since the data sensing operations on the first to fourth planes are performed while overlapping with each other, a read time can be reduced. Subsequently, data read from the first plane is output to the memory controller 1200 (Dout: RQ H), data read from the second plane is output to the memory controller 1200 (Dout: RQ C), data read from the third plane is output to the memory controller 1200 (Dout: RQ A), and data read from the fourth plane is output to the memory controller 1200 (Dout: RQ F).

During the period t4 to t5, the memory controller 1200 may pair read requests that are to be paired among the subsequent read requests, or search for a read request that has been map-cache-hit. In the embodiment shown in FIG. 13, subsequent read requests E and G have not yet been paired. In addition, the read request E is a read request that has not been map-cache-hit, and the read request G is a read request that has been map-cache-hit. Therefore, after time t5, the map-cache-hit read request G may be designated as a top priority read request.

As shown in FIG. 13, according to the memory controller and the operating method thereof in accordance with the embodiment of the present disclosure, a read request that has been map-cache-hit is preferentially processed, so that a phenomenon can be prevented in which, since read requests for some planes are not input, pairing is delayed, and therefore, the entire read speed is lowered. Further, a pairing operation on subsequent read requests is performed while the read request that has been map-cache hit is being processed, so that a phenomenon can be reduced in which a read delay occurs due to the pairing.

Figure 14:
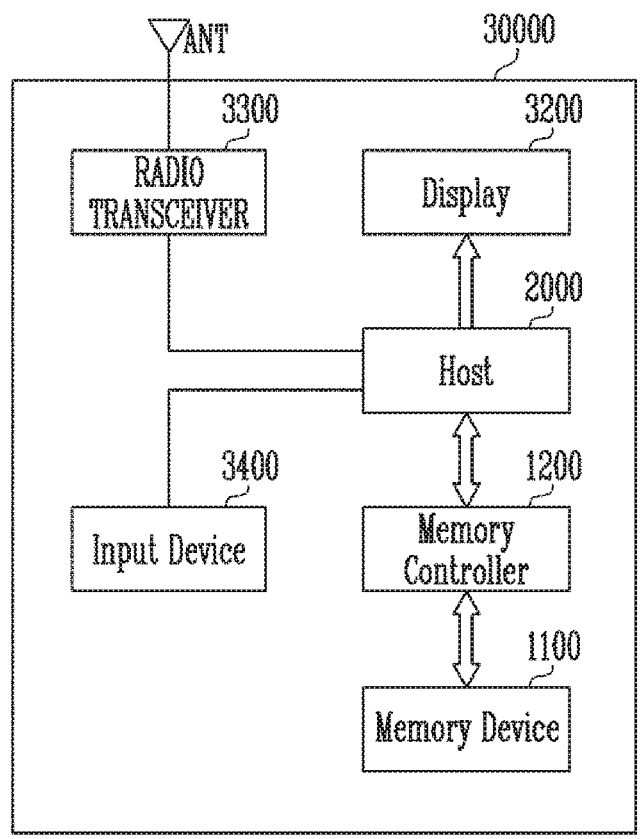
FIG. 14 is a diagram illustrating an embodiment of the memory system including the memory controller shown in FIG. 7.

FIG. 14 is a diagram illustrating another embodiment of the memory system including the memory controller shown in FIG. 7.

Referring to FIG. 14, the memory system 30000 may be implemented as a cellular phone, a smart phone, a tablet PC, a personal digital assistant (PDA), or a wireless communication device.

The memory system 30000 may include a memory device 1100 and a memory controller 1200 capable of controlling an operation of the memory device 1100. The memory controller 1200 may control a data access operation of the memory device 1100, e.g., a program operation, an erase operation, a read operation, or the like under the control of a host 2000.

Data programmed in the memory device 1100 may be output through a display 3200 under the control of the memory controller 1200.

A radio transceiver 3300 may transmit/receive radio signals through an antenna ANT. For example, the radio transceiver 3300 may change a radio signal received through the antenna ANT into a signal that can be processed by the host 2000. Therefore, the host 2000 may process a signal output from the radio transceiver 3300 and transmit the processed signal to the memory controller 1200 or the display 3200. The memory controller 1200 may transmit the signal processed by the host 2000 to the semiconductor memory device 1100. Also, the radio transceiver 3300 may change a signal output from the host 2000 into a radio signal, and output the changed radio signal to an external device through the antenna ANT. An input device 3400 is a device capable of inputting a control signal for controlling an operation of the host 2000 or data to be processed by the host 2000, and may be implemented as a pointing device such as a touch pad or a computer mouse, a keypad, or a keyboard. The host 2000 may control an operation of the display 3200 such that data output from the memory controller 1200, data output from the radio transceiver 3300, or data output from the input device 3400 can be output through the display 3200.

Figure 15:
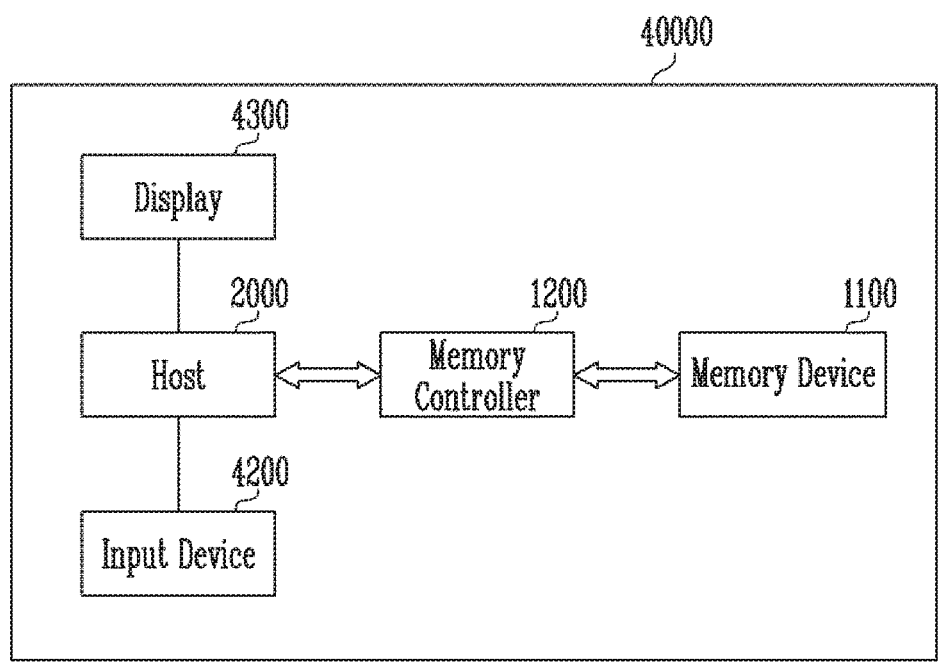
FIG. 15 is a diagram illustrating another embodiment of the memory system including the memory controller shown in FIG. 7.

FIG. 15 is a diagram illustrating another embodiment of the memory system including the memory controller shown in FIG. 7.

Referring to FIG. 15, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include a memory device 1100 and a memory controller 1200 capable of controlling a data processing operation of the memory device 1100.

A host 2000 may output data stored in the memory device 1100 through a display 4300 according to data input through an input device 4200. For example, the input device 4200 may be implemented as a pointing device such as a touch pad or a computer mouse, a keypad, or a keyboard.

The host 2000 may control the overall operations of the memory system 40000, and control an operation of the memory controller 1200.

Figure 16:
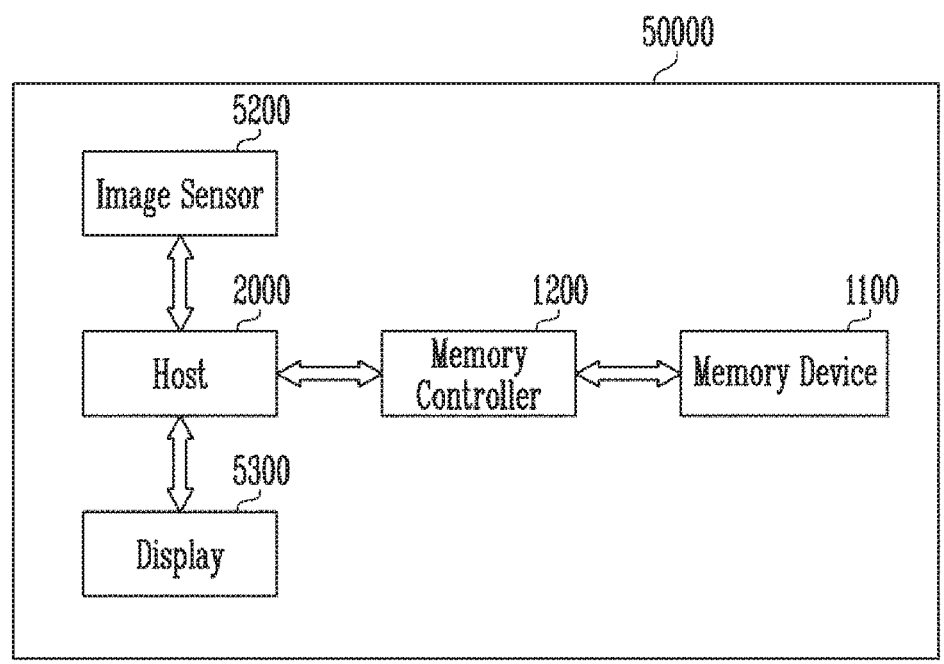
FIG. 16 is a diagram illustrating another embodiment of the memory system including the memory controller shown in FIG. 7.

FIG. 16 is a diagram illustrating another embodiment of the memory system including the memory controller shown in FIG. 7.

Referring to FIG. 16, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a memory device 1100 and a memory controller 1200 capable of controlling a data processing operation of the memory device 1100, e.g., a program operation, an erase operation, or a read operation.

An image sensor 5200 of the memory system 50000 may convert an optical image into digital signals, and the converted digital signals may be transmitted to a host 2000 or the memory controller 1200. Under the control of the host 2000, the converted digital signals may be output through a display 5300, or be stored in the memory device 1100 through the memory controller 1200. In addition, data stored in the memory device 1100 may be output through the display 5300 under the control of the host 2000.

Figure 17:
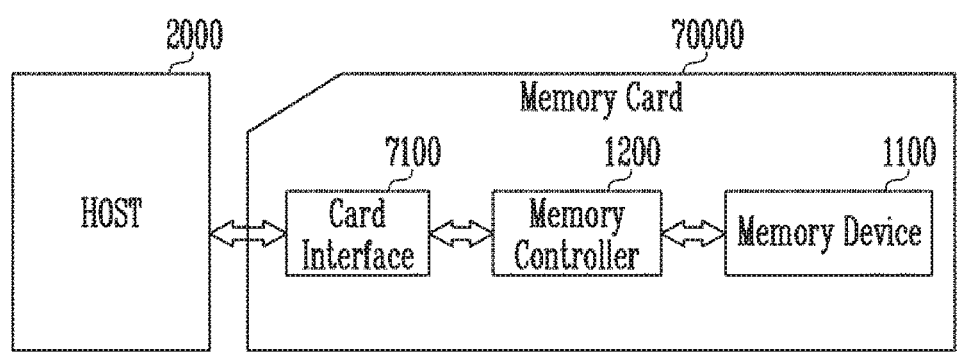
FIG. 17 is a diagram illustrating an embodiment of the memory system including the memory controller shown in FIG. 7.

FIG. 17 is a diagram illustrating another embodiment of the memory system including the memory controller shown in FIG. 7.

Referring to FIG. 17, the memory system may include a host 2000 and a memory card 70000.

The memory card 70000 may be implemented with a smart card. The memory card 70000 may include a memory device 1100, a memory controller 1200, and a card interface 7100.

The memory controller 1200 may control data exchange between the memory device 1100 and the card interface 7100. In some embodiments, the card interface 7100 may be a Secure Digital (SD) card interface or a Multi-Media Card (MMC) interface, but the present disclosure is not limited thereto. Also, the card interface 7100 may interface data exchange between a host 2000 and the memory controller 1200 according to a protocol of the host 2000. In some embodiments, the card interface 7100 may support a Universal Serial Bus (USB) protocol and an Inter-Chip (IC)-USB protocol. The card interface 7100 may mean hardware capable of supporting a protocol used by the host 2000, software embedded in the hardware, or a signal transmission scheme.

In accordance with the present disclosure, there can be provided a memory controller capable of increasing the speed of a read operation and a memory system having the memory controller.

Example embodiments have been disclosed herein, and although specific terms are employed, the terms are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory controller for controlling, based on a request from a host, an operation of a memory device including a plurality of planes, the memory controller comprising:
   a request storage unit configured to store a plurality of read requests received from the host; and
   a request controller configured to control the request storage unit to prioritize performing a processing operation for a read request that has a logical to physical mapping in a cache, over a pairing operation for multi-plane reading, based on whether the plurality of read requests have a respective logical to physical mapping in the cache.

2. The memory controller of claim 1, wherein the request controller controls the request storage unit to process a top priority read request when the top priority read request stored in the request storage unit is a read request that has been paired.

3. The memory controller of claim 1, wherein the request controller controls the request storage unit to perform the processing operation of the read request based on whether the plurality of read requests have the respective logical to physical mapping in the cache, when a top priority read request stored in the request storage unit is a read request that has not been paired.

4. The memory controller of claim 3, wherein the request controller designates the read request that has the logical to physical mapping in the cache, as a top priority read request when the read request exists among the plurality of read requests.

5. The memory controller of claim 4, wherein the request controller performs a pairing operation of the plurality of read requests that do not have the respective logical to physical mapping in the cache, while the read request is being processed.

6. The memory controller of claim 3, wherein the request controller performs a pairing operation on a current top priority read request when the read request that has the logical to physical mapping in the cache, does not exist among the plurality of read requests.

7. The memory controller of claim 1, wherein the cache is configured to cache at least a portion of map data stored in the memory device.

8. The memory controller of claim 1, further comprising a command generator configured to generate a read command based on a top priority read request received from the request storage unit.

9. A memory system for performing a read operation of data based on a read request from a host, the memory system comprising:
   a memory device including a plurality of planes; and
   a memory controller configured to control the memory device to perform a multi-plane read operation by paring read requests of different planes among a plurality of read requests received from the host,
   wherein the memory controller controls the memory device to prioritize performing a read operation based on a read request that has a logical to physical mapping in a cache, over a pairing operation for multi-plane reading, based on whether the plurality of read requests have a respective logical to physical mapping in the cache.

10. The memory system of claim 9, wherein the memory controller controls the memory device to prioritize performing the read operation based on the read request that has the logical to physical mapping in the cache, when the read request exists among the plurality of read requests.

11. The memory system of claim 10, wherein the memory controller performs a pairing operation of the plurality of read requests that have not been processed while the read operation, based on the read request that has the logical to physical mapping in the cache, is being performed.

12. The memory system of claim 9, wherein the memory controller performs a pairing operation of a top priority read request among the plurality of received read requests when the read request that has the logical to physical mapping in the cache, does not exist among the plurality of read requests.

13. A method for operating a memory controller for controlling a read operation of a memory device including a plurality of planes, the method comprising:
   receiving a plurality of read requests from a host;
   prioritizing performing a processing operation for a read request that has a logical to physical mapping in the cache, over a pairing operation for multi-plane reading, based on whether the plurality of read requests have a respective logical to physical mapping in the cache,
   wherein the prioritizing performing the processing operation comprises:
      determining whether the read request that has the logical to physical mapping in the cache among the plurality of read requests, exists;
      and processing the plurality of read requests based on the determination result.

14. The method of claim 13, wherein the processing of the plurality of read requests when the read request that has the logical to physical mapping in the cache exists as the determination result includes:
   designating the read request as a top priority read request; and
   controlling the memory device to perform a read operation corresponding to the top priority read request.

15. The method of claim 14, wherein the processing of the plurality of read requests further includes pairing read requests for different planes among the plurality of read requests that have not been processed while the memory device is performing the read operation corresponding to the top priority read request.

16. The method of claim 13, wherein the processing of the plurality of read requests when the read request that has the logical to physical mapping in the cache, does not exist as the determination result includes:
   performing a pairing operation on a top priority read request among the plurality of read requests; and
   controlling the memory device to perform a read operation corresponding to the paired top priority read request.

* * * * *